United States Patent Office 2,955,089
Patented Oct. 4, 1960

2,955,089

REACTIVATION OF DEACTIVATED CATALYST

William K. T. Gleim, Island Lake, Ill., assignor, by mesne assignments, to Universal Oil Products Company, Des Plaines, Ill., a corporation of Delaware No Drawing. Filed Aug. 2, 1957, Ser. No. 675,814

2 Claims. (Cl. 252—413)

This invention relates to a process for reactivating a deactivated noble metal-containing catalyst. More specifically, this invention relates to a process for reactivating a deactivated noble metal-containing catalytic composite without substantially removing the metallic contaminants effecting the deactivated conditions of the catalyst.

When utilized as catalysts, the noble metals may be used as such, but are generally employed in combination with a carrier material such as a refractory metal oxide. These catalysts are useful for effecting reactions of organic compounds, and particularly of hydrocarbons, including dehydrogenation, hydrogenation, cyclization, dehydrocyclization, hydrocracking, isomerization, oxidation, etc. During use, the catalyst generally becomes contaminated with impurities resulting thereby in a catalyst having a degree of activity which is lower than the original activity of the catalyst. The activity is continually diminished until such time as the catalyst is completely deactivated, and will no longer function to the intended extent. Partial activity may be restored through the removal of carbonaceous deposits or other impurities from the catalyst by burning in an atmosphere of oxygen. However, in most instances, the activity of the catalyst is not restored to the original level. The present invention may be utilized to obtain the desired activity level through the use of a specific reactivation process.

Noble metals, particularly platinum and palladium, have recently become commercially important for use as catalytic materials, and specifically as catalysts to be used in the reforming of hydrocarbon fractions. These catalysts generally contain small quantities of noble metals, usually within the range of from about 0.01% to about 1% by weight of the final catalyst.

These noble metal-containing catalysts are rapidly deactivated by relatively minor amounts of metallic impurities. As hereinabove set forth, the quantity of the noble metal contained in the final catalyst is small, and therefore the amount of metallic impurities required to deactivate the catalyst may be of an extremely small quantity. Various methods are currently employed in processes for the removal of the metallic impurities from a petroleum hydrocarbon before the noble metal-containing catalyst is subjected to the reforming of the hydrocarbon. These processes for the removal of metallic impurities are effective in reducing the quantity of contaminant found in the petroleum hydrocarbon to an extremely small quantity, but, as hereinabove set forth, the noble metal-containing catalyst becomes gradually contaminated with these metallic impurities and is eventually subjected to a decline in activity which cannot be tolerated on an economic basis.

In the reforming of hydrocarbons, it has been found that certain hydrocarbon charge stocks rapidly deactivate the noble metal catalysts and render the same incapable of catalyzing the desired reactions. Various impurities such as lead, arsenic, copper, sulfur, etc., but particularly arsenic, are present in hydrocarbon charge stocks in minute quantities and effect rapid deactivation of the catalyst. The active metallic components appear to combine with these impurities, with the result that the latter are difficult to remove by the ordinarily employed methods of catalyst reactivation. The success of a reactivation procedure is generally dependent upon removal of such impurities; that is, the catalyst will be regenerated only when it is substantially completely free from such impurities. The object of the present invention is directly applicable to this problem. The process of this invention may be used directly on fresh catalyst and deactivated catalyst, and will produce a catalyst from which the metallic impurities need not necessarily be removed.

In one embodiment, the present invention relates to a process for reactivating a deactivated noble metal-containing catalytic composite which comprises treating said composite in the presence of an alkalinous metal permanganate, iodine, and sulfuric acid. The term "alkalinous metal" is used herein to mean the alkali metals and alkaline earth metals.

In a specific embodiment the present invention relates to a process for reactivating a deactivated alumina-platinum-combined halogen catalyst which comprises treating said catalyst in the presence of from about 1.0% to about 10% by weight of an alkalinous metal permanganate, from about 0.1% to about 1% by weight of iodine, and from about 1% to about 10% by weight of sulfuric acid.

In a more specific embodiment the present invention relates to a process for reactivating a deactivated alumina-platinum-combined halogen catalyst containing arsenic which comprises treating said catalyst for a period of from about one hour to about 24 hours at a temperature of from about 10° C. to about 100° C. in the presence of from about 1.0% to about 10% by weight of an alkalinous metal permanganate, from about 0.01% to about 1% by weight of iodine, and from about 1% to about 10% by weight of sulfuric acid without substantially removing the arsenic from said composite.

The noble metals in the noble metal-containing composite which may be treated in accordance with the method of the present invention include platinum, palladium, iridium, rhodium, ruthenium, osmium, etc. As hereinabove set forth, these noble metals, when used as catalysts are generally associated with a refractory metal oxide. In particular, an oxide of a metal in the left hand columns of group III and IV of the periodic table include specifically the oxides of aluminum, titanium, zirconium, hafnium, thorium, etc. In some cases two or more of the metal oxides may be included in the catalyst and in other cases, activating components may also be associated with the catalyst. The process of the present invention reactivates a deactivated catalyst in a manner whereby the impurities, effecting the deactivation of the catalyst, are rendered ineffective, but which are not necessarily completely removed. In accordance with the present invention, the noble metal-containing catalytic composite, containing a metallic impurity, is treated with an alkalinous metal permanganate, iodine, and sulfuric acid. As hereinafter set forth, the removal of the metallic contaminant is not required for the reactivation of the deactivated catalyst.

The iodine employed in the process of the present invention is present in concentrations in excess of about 0.01% by weight. The concentration of the alkalinous metal permanganate is within the range of from about 1% to about 10% by weight. The alkalinous metal may be any of the alkali metals, such as sodium, potassium, ammonium, etc. or any of the alkaline earth metals, such as barium, calcium, etc. The concentration of the sulfuric acid is within the range of from about 1% to about 10% by weight. The treating of the deactivated catalyst may be conducted in a batchwise fashion or it may be continuous. The treating solution is intimately contacted with the deactivated catalyst for a period in excess of one hour, and preferably, for about one hour to about 24 hours. In general, the treatment is effected at a temperature in excess of about 10° C. and less than about 100° C. In a continuous type of operation the deactivated catalyst and the solution of alkalinous metal permanganate, iodine, and sulfuric acid may be passed through a treating zone in countercurrent or concurrent flow, each being withdrawn continuously from the treating zone. In some cases, however, it may be desirable to effect the treatment in two or more successive steps. After the composite has been treated with the solution, it may be washed to remove other soluble impurities, and this treatment is preferably effected at a temperature not in excess of 200° C. and usually, for convenience, at normal or room temperature. The noble metal-containing composite is then washed and dried.

The following example is introduced to illustrate further the novelty and utility of the present invention, and the benefits to be derived from the use thereof. It is not intended to limit unduly the process of the present invention to the specific procedure described.

EXAMPLE 125 gram portions of a deactivated composite containing alumina, 0.31% by weight of platinum, 0.45% by weight of fluorine, and 0.06% by weight of arsenic were separately and individually treated with various aqueous solutions at different temperature levels. These solutions were the following: potassium permanganate and iodine, ammonium persulfate and silver sulfate, and sodium iodate. All of the above-mentioned salts were dissolved in a sulfuric acid solution. These solutions were commingled with the composite for approximately 24 hours, after which time the solutions were removed, the composite dried and subsequently analyzed for arsenic content.

Evaluation tests were also conducted on each portion of the composite after the treatment with the solution. The evaluation test consisted of passing hydrogen and low naphthene stock, containing 0.01% by weight of sulfur, over the composite at a liquid hourly space velocity of 2.0, at 958° F. and under an imposed pressure of 500 p.s.i.g. The product resulting from this processing is passed through a high pressure separator which is operated at a temperature of 55° C. after which the product is debutanized. The debutanized product is then tested for its F-1 clear research octane number. The F-1 clear research octane number of the untreated composite was 84.1. The solution employed, arsenic concentration after treatment with the solution, F-1 clear research octane number after treatment with the solution, and the particular temperature level employed are tabulated in the table below.

Table I

| Solution, Percent by Wt. | Temperature, ° C. | Wt. Percent Arsenic | F-1 Clear Research Octane Number |
|---|---|---|---|
| 5% H₂SO₄+5% KMnO₄+0.1% I | 50 | .05 | 93.6 |
| 5% H₂SO₄+5% KMnO₄+0.1% I | 200 | .025 | 24.0 |
| 5% H₂SO₄+5% (NH₄)₂S₂O₈+1% Ag₂SO₄ | 25 | .06 | |
| 5% H₂SO₄+5% (NH₄)₂S₂O₈+1% Ag₂SO₄ | 200 | .025 | 42.0 |
| 5% H₂SO₄+5% NaIO₃ | 200 | .02 | 25.7 |

From the above data it is evident that the solution with the 0.1% by weight of iodine, 5% by weight of potassium permanganate, and 5% by weight of sulfuric acid accomplished the reactivation of the deactivated catalyst without a substantial removal of arsenic therefrom. It is of particular note that the arsenic content in each of the other cases has been substantially reduced from the 0.06 weight percent arsenic that originally existed on the deactivated catalyst. However, the activity, as indicated by the F-1 clear research octane number, has not returned to the high activity level.

When the evaluation test was conducted on the composite that had been treated with a concentration of 5% by weight of ammonium persulfate, 1% by weight of silver sulfate, and 5% by weight of sulfuric acid at a temperature of 25° C., an F-1 clear research octane number could not be obtained on the resulting debutanized product. This particular composite caused a rapid reduction in the imposed pressure of 500 p.s.i.g. when the low naphthene stock was passed over the composite. From these results it was evident that the composite was causing a considerable amount of hydrocracking of the low naphthenic stock. An F-1 clear research octane number was therefore not obtained in conjunction with this composite because of its extremely deactivated state due to treatment with the solution herein stated above.

I claim as my invention:

1. A process for reactivating a deactivated alumina-platinum catalytic composite containing arsenic which comprises contacting said composite for a period of from about one hour to about 24 hours at a temperature of from about 10° C. to about 100° C. with an aqueous solution of from about 1.0% to about 10% by weight of an alkali metal permanganate, from about 0.01% to about 1% by weight of iodine, and from about 1% to about 10% by weight sulfuric acid without substantially removing the arsenic from said composite.

2. A process for reactivating a deactivated alumina-platinum-combined halogen catalyst containing arsenic which comprises contacting said catalyst for a period from about one hour to about 24 hours at a temperature of from about 10° C. to about 100° C. with a mixture of from about 1.0% to about 10% by weight of alkali metal permanganate, from about 0.01% to about 1% by weight of iodine, and from about 1% to about 10% by weight sulfuric acid.

References Cited in the file of this patent

UNITED STATES PATENTS

| 1,806,690 | Kroener et al. | May 26, 1931 |
| 1,904,582 | Watts | Apr. 18, 1933 |
| 2,692,240 | Sprauer | Oct. 19, 1954 |

FOREIGN PATENTS

| 115,333 | Germany | Oct. 31, 1900 |